United States Patent [19]

Menichini et al.

[11] Patent Number: 4,973,070
[45] Date of Patent: Nov. 27, 1990

[54] DEVICE FOR REGULATING THE LENGTH OF THE ARMS OF SUSPENSIONS OF MOTOR VEHICLES

[75] Inventors: Flavio Menichini; Eugenio Perri, both of Milan, Italy

[73] Assignee: Alfa Lancia Industriale S.p.A., Arese, Italy

[21] Appl. No.: 340,083

[22] Filed: Apr. 18, 1990

[30] Foreign Application Priority Data

Apr. 18, 1988 [IT] Italy .................... 20219 A/88

[51] Int. Cl.⁵ .................... B60G 3/18; B60G 3/06; B62D 6/00
[52] U.S. Cl. .................... 280/91; 180/140; 280/690; 280/691; 280/693
[58] Field of Search .................. 280/95.1, 87, 660, 663, 280/666, 667, 691, 725, 94, 91, 661, 690, 693; 180/140

[56] References Cited

U.S. PATENT DOCUMENTS

| | | | |
|---|---|---|---|
| 3,498,630 | 3/1970 | Crawford | 280/87 |
| 4,120,507 | 10/1978 | Miller | 280/95.1 |
| 4,159,128 | 6/1979 | Blaine | 280/95.1 |
| 4,534,575 | 8/1985 | Grove et al. | 280/95.1 |
| 4,729,578 | 3/1988 | Kondo et al. | 280/691 |
| 4,740,012 | 4/1988 | Kondo et al. | 280/691 |
| 4,799,703 | 1/1989 | Mueller et al. | 280/91 |

FOREIGN PATENT DOCUMENTS

| | | |
|---|---|---|
| 0096372 | 12/1983 | European Pat. Off. . |
| 0242883 | 10/1987 | European Pat. Off. . |
| 0277650 | 8/1988 | Fed. Rep. of Germany . |
| 2474967 | 8/1981 | France . |
| 2596010 | 9/1987 | France . |

Primary Examiner—Richard A. Bertsch
Attorney, Agent, or Firm—Charles E. Brown; Charles A. Brown

[57] ABSTRACT

At least one arm of suspension of each wheel of a vehicle axle is formed by at least two rods interconnected by telescopically-coupled members, which, on command, are capable of approaching or taking away the same rods to/from each other, in order to reduce or increase the length the same arm, so as to change the orientation of the rear wheels of the vehicle.

7 Claims, 4 Drawing Sheets

DEVICE FOR REGULATING THE LENGTH OF THE ARMS OF SUSPENSIONS OF MOTOR VEHICLES

The present invention relates to a device capable of varying, on command, the length of arms of independent suspensions of the wheels of a motor vehicle, in particular of the wheels of the rear axle, in order to achieve a steering of the same wheels, and/or a change in the convergence of the same wheels, during the traveling of the same motor vehicle.

At present, the trend exists in the art to develop motor vehicles provided with steering systems of the so-said "integral steering" type, which enable the rear wheels to steer together with the front wheels.

Generally these systems comprise a transversely mobile bar linked with tie-rods constrained to the rear wheels, with said bar being also operatively linked with the steering mechanism of the front wheels.

At low vehicle speeds, the rear wheels are steered in an opposite directions relatively to the front wheels, in order to decrease the minimum steering radius and improve the manoeuverability of the same vehicle, in particular during the parking operations.

At high vehicle speeds, the rear wheels are steered in the same direction as of the front wheels, in order to reduce the bend entering transient, with the handling of the same vehicle being improved, and faster changes in trajectory being made possible, in particular during the overtaking procedures.

In the motor vehicles equipped with independent rear suspensions, the rear wheels are installed with a certain convergence in order to improve the stability of the rear axle in the lateral direction during the rectilinilear traveling, or in order to obtain an understeering effect in the bends.

Certain types of rear independent axles are provided with arms which can be adjusted in length by means of a screw/nut screw mechanisms, which make it possible the convergence of the wheels to be adjusted under stationary vehicle conditions.

In most cases, angles of convergence of very small value are adopted in order to prevent the tyres from undergoing excessive and irregular wears, therefore the optimum position of the wheels as a function of the vehicle traveling conditions cannot be accomplished.

A purpose of the present invention is a device capable of regulating the length of the arms of independent suspensions of the wheels of an axle, by separately and individually acting on the respective suspension arm of each vehicle wheel.

Another purpose of the present invention is a device capable of varying, on command, the length of the suspension arms while the vehicle is running.

The device according to the present invention comprises at least one arm of suspension of each one of the wheels of an axle, wherein the same arm is formed by at least two rods, with the one of said rods being constrained to the respective wheel, and the other one of said rods being constrained to the body of the vehicle, the device being characterized in that the above said two rods are interconnected by means of telescopically coupled members, which can be actuated on command in order to increase and reduce the length of the same arm, by means of actuator means operatively connected with a central control unit, with said central control unit being in its turn operatively connected with detector means for preselected parameters, indicative of the operating conditions of the motor vehicle, and capable of generating control signals as a function of the values of the above said parameters.

The above said telescopically coupled members are preferably formed by screw/nut screw elements and the above-said actuator means are preferably constituted by a small electrical motor operatively linked with one of the above said elements.

By means of this solution, the arm of suspension of a wheel can be increased in length, and the arm of suspension of the other wheel of the axle can be simultaneously reduced in length, in order to achieve a steering of the wheels, preferably the wheels of the rear axles, around respective steerinq axes, as a function of the angle of the steering wheel and of the speed of the vehicle.

The herein disclosed solution makes it furthermore possible the arms of suspension of both of the wheels of an axle, preferably those of the rear axle, to be simultaneously increased or reduced in length, in order to achieve a change in convergence of the same wheels, e.g., above a determined speed, and when the vehicle is braking.

From the above, a particularly functional device results, which is simple to be manufactured, and is endowed with reduced weight and overall dimensions.

Further characteristics and advantages of the finding will be illustrated now, by referring to the hereto attaches FIGS. 1-4, wherein a preferred, nonlimitative form of practical embodiment of the same finding is shown for exemplifying purposes.

Figure 1:
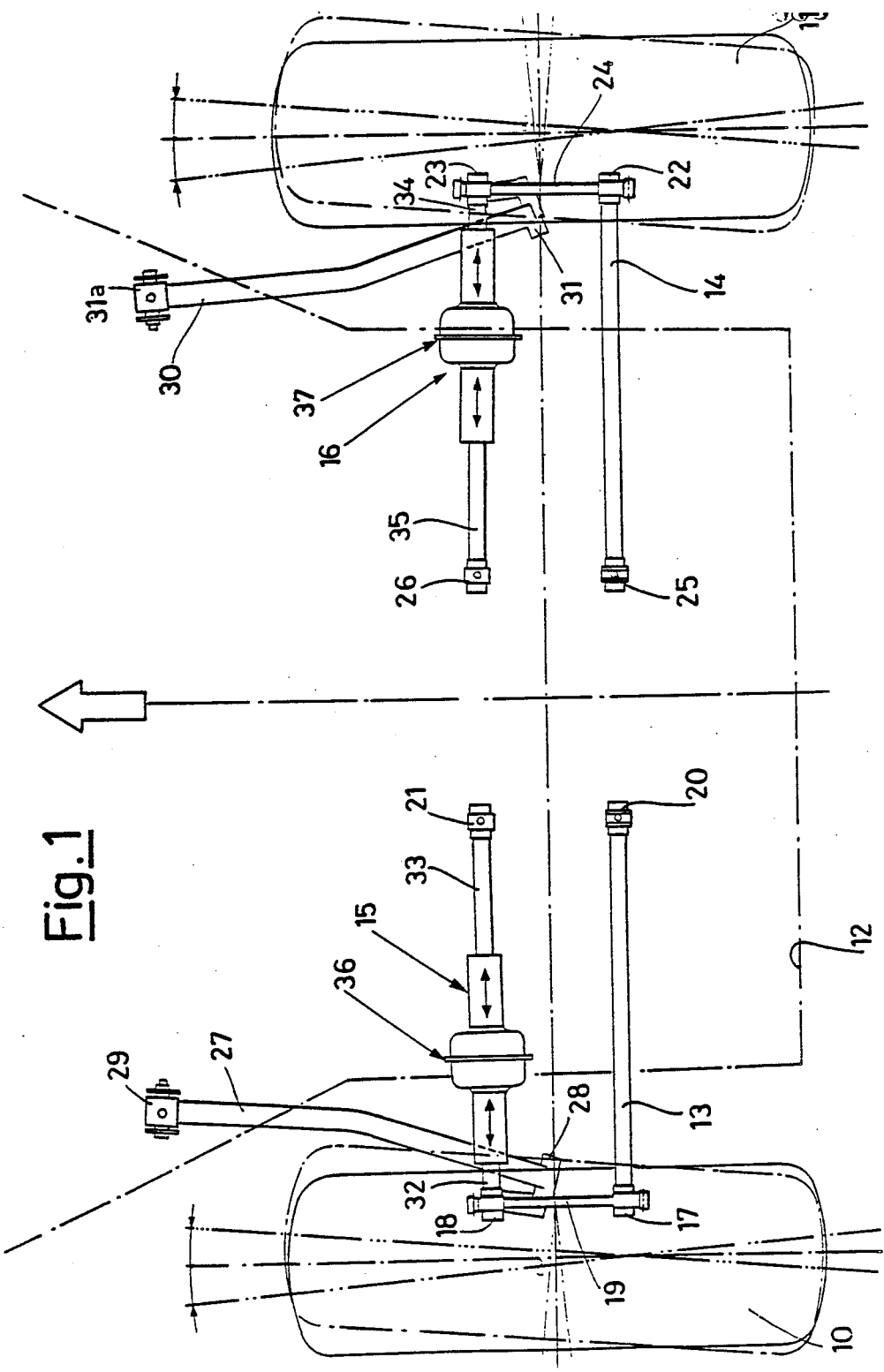
FIG. 1 shows a plan view of the rear axle of a motor vehicle equipped with the regulating device according to the present invention.

In FIG. 1, the rear wheels of a motor vehicle are indicated by the reference numerals 10 and 11; each wheel is linked with the body 12 of the same motor vehicle, represented in a schematic form, by means of a pair of transversal tie-rods, a longitudinal strut and a substantially vertical leg, not shown, formed by a shock absorbed and a spring.

In FIG. 1, the transversal tie-rods which form two arms of suspension of the wheels 10 and 11 are respectively indicated by the reference numerals 13 and 14; and the transversal tie-rods which constitute two further arms of suspension of the same wheels are generally indicated by the reference numerals 15 and 16; the tie-rods 13 and 15 are pivotally hinged by means of the elastic bushes 17 and 18 to the pivot 19, fastened to the support, or hub, not, shown, of the wheel 10; the same tie-rods 13 and 15 are also hinged to the body 12 of the vehicle by means of the elastic bushes 20 and 21; the tie-rods 14 and 16 are pivotally hinged by means of the elastic bushes 22 and 23 to the pivot 24, fastened to the support, or hub, not shown in the figures, of the wheel 11; the same tie-rods 14 and 16 are also hinged to the body 12 of the vehicle by means of the elastic bushes 25 and 26.

The reference numeral 27 indicates the longitudinal strut which constitutes a further arm of suspension of the wheel 10 and is hinged to the support of the same wheel 10 by means of the elastic bush 28 and to the vehicle body 12 by means of the elastic bush 29.

The reference numeral 30 indicates the longitudinal strut which constitutes a further arm of suspension of thee wheel 11 and is hinged to the support of the same wheel 11 by means of the elastic bush 31 and to the vehicle body 12 by means of the elastic bush 31a.

The tie-rods 15 and 16 are each formed by two rods, respectively indicated by the reference numerals 32, 33 and 34, 35, interconnected by telescopic elements, generally indicated by the reference numerals 36 and 37.

Figure 2:
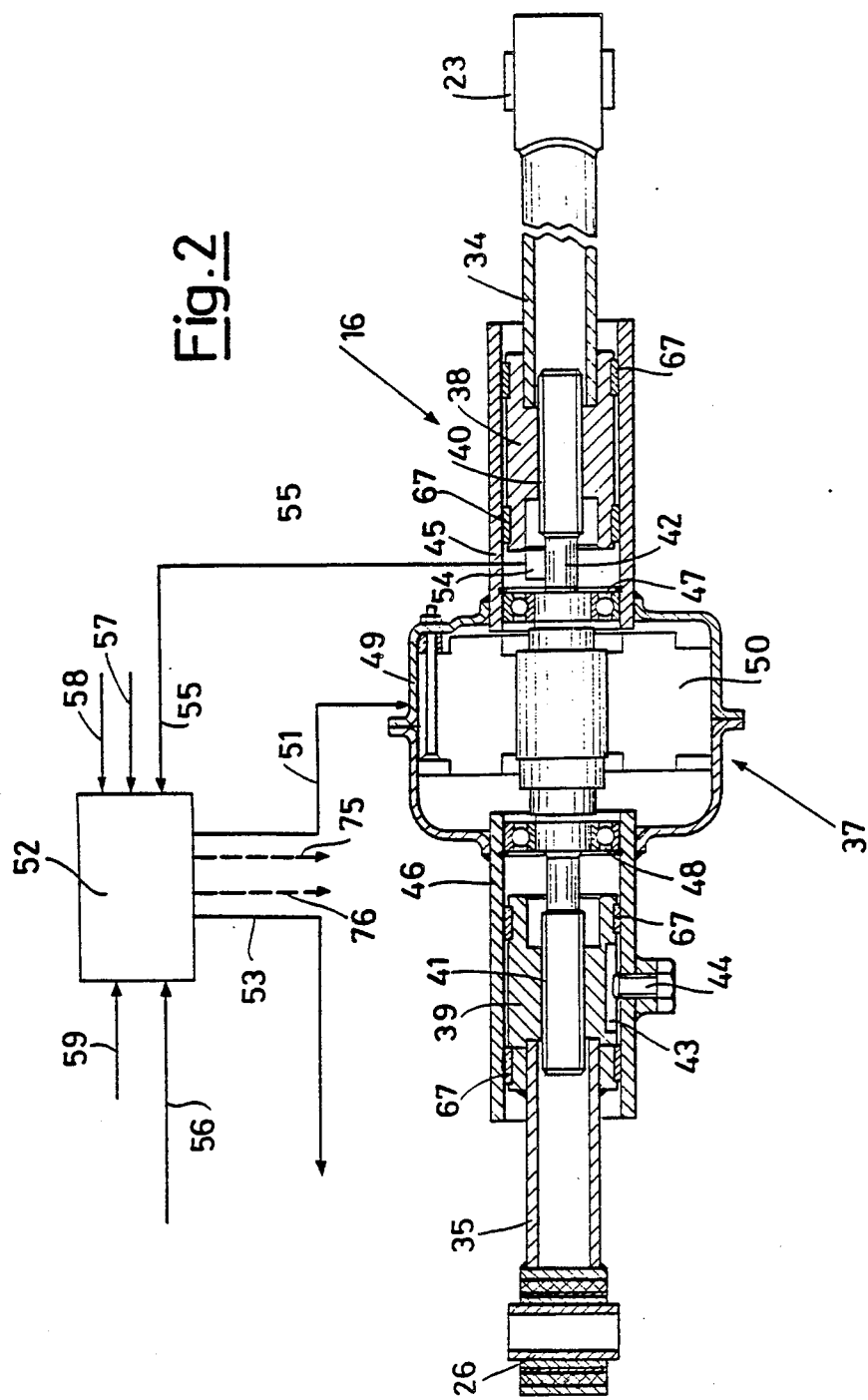
FIG. 2 shows a form of practical embodiment of a component of the device of FIG. 1.

As shown in FIG. 2, to the rods 34 and 35, which, in this particular case, are hollow, there are welded internally screw-threaded sleeves, respectively indicated by the reference numerals 38 and 39, having threadings directed in directions opposite to each other. Said sleeves 38 and 39 respectively engage with the external right-hand screw-thread and left-hand screw-thread, respectively indicated by the reference numerals 40 and 41, of the spindle 42. The coupling can be rendered more or less irreversible by suitably selecting the angle of inclination of the spiral of the threads.

The screw-threaded sleeves 38 and 39 are provided with external slots, such as the slot indicated by the reference numeral 43, inside which the shaped ends engage of screws, such as screw 44, fastened onto the tubular sheaths 45 and 46.

The sLeeves 38 and 39 are slideably supported inside the sheaths 45 and 46 by means of the sleeves 67.

The tubular sheaths 45 and 46 rotatably support, through the bearings 47 and 48, the spindle 42, and are welded to the box 49, which contains an electrical motor, indicated by the reference numeral 50, capable of driving, on command, the spindle 42 to revolve, in clockwise direction or in counterclockwise direction.

The electrical motor 50 is connected, by means of a line 51, with a central control unit schematically represented by the block 52, which, e.g., could be constituted by a programmed microprocessor.

The central control unit 52 is also connected, through the line 53, with the electrical motor, not shown, which actuates the telescopic member 36 of the tie-rod 15 of FIG. 1, not shown because it is at all identical to the telescopic member (37) of FIG. 2.

By the reference numeral 54 a detector means is shown, which is used in order to detect the axial position of the sleeve 38 relatively to the spindle 42. Such a detector means may consist, e.g., of a potentiometer.

The detector means 54 is connected with the central control unit 52 by means of the line 55 and an analogous detector means, not shown, provided for the telescopic member 36, is connected with the same central control unit 52 by means of the line 56.

To the central control unit 52 the values of preselected parameters arrive, which are indicative of the operating conditions of the motor vehicle, such as, for example: the steering angle of the steering wheel, the traveling speed of the motor vehicle, the deceleration during braking; such parameters are schematically represented by the arrows respectively indicated by the reference numerals 57, 58, 59.

The central control unit 52 is programmed in order to process these parameters and send control signals to the electrical motor 50 and to the electrical motor analogous to it, provided for the tie-rod 15.

Under a determined value of vehicle speed, and for steering angles of the steering wheel higher than a pre-established value, the central control unit 52 intervenes in order to command the wheels 10 and 11 to steer over a pre-established angle, in general of a few degrees (°), in a direction opposite to the steering direction of the front wheels of the same vehicle, with said front wheels being controlled by the usual steering mechanism by means of the steering wheel.

Above a certain vehicle speed, and for angles of rotation of the steering wheels lower than a pre-established value, the central control unit 52 intervenes in order to command the wheels 10 and 11 to steer over a pre-established angle, in general of a few degrees (°), in the same direction as of the front wheels of the same vehicle.

For that end, the central control unit 52 sends to the electrical motor 50 a suitable control signal to cause the spindle 42 to rotate according to a determined direction, so that, through the screw-threaded couplings 40 and 41 and the coupling means 43 and 44, the sleeves 38 and 39 are caused to slide relatively to their sheaths 45 and 46, in such a direction as to move away from, or approach to, each other, together with the respective hollow rods 34 and 35, and correspondingly increase or reduce the length of the tie-rod 16.

Simultaneously, the central control unit 52 sends to the electrical motor, operatively linked with the telescopic member 36 and with the rods 32, 33 of the tie-rod 15, a suitable signal for causing the relevant spindle to revolve in an opposite direction relatively to the spindle 42, so that the tie-rod 15 is reduced or increased in length, to the contrary of the tie-rod 16, and the wheels 10 and 11 are steered in the desired direction, as depicted in chain line in FIG. 1; this is made possible by the yielding of the elastic bushes 17, 18, 20, 21 and 22, 23, 25, 26.

The wheel 10 rotates around an axis passing through the articulation which links the respective vertical leg, not shown, with the vehicle body; and through the elastic bush 17; and the wheel 11 rotates around an axis of its own, passing through its articulation and the elastic bush 22.

The steering of the rear wheels improves the handling of the vehicle during the bend entering transients and in trajectory changes.

The central control unit 52 is also programmed in order to command changes to occur in the convergence of the wheels 10 and 11, in general by angles of the order of magnitude of tenths of a degree, when the vehicle runs according to a rectilinear trajectory above a certain speed, or brakes.

In these cases, the central control unit 52 sends to the electrical motor 50 and to the motor analogous to it, suitable command signals for reducing the length of both of the tie-rods 16 and 15, and for causing the wheels 10 and 11 to steer towards the centre of the vehicle in order to increase the convergence thereof, so as to improve the stability of the vehicle when this latter runs at a high speed, or to correct the effect of divergence caused by the braking.

The central control unit 52 verifies that the increase or reduction in length of the tie-rods 15 and 16 takes place according to the programmed values, by means of the feedback signals supplied by the detector means, such as the one indicated by the reference numeral 54 in FIG. 2.

Figure 3:
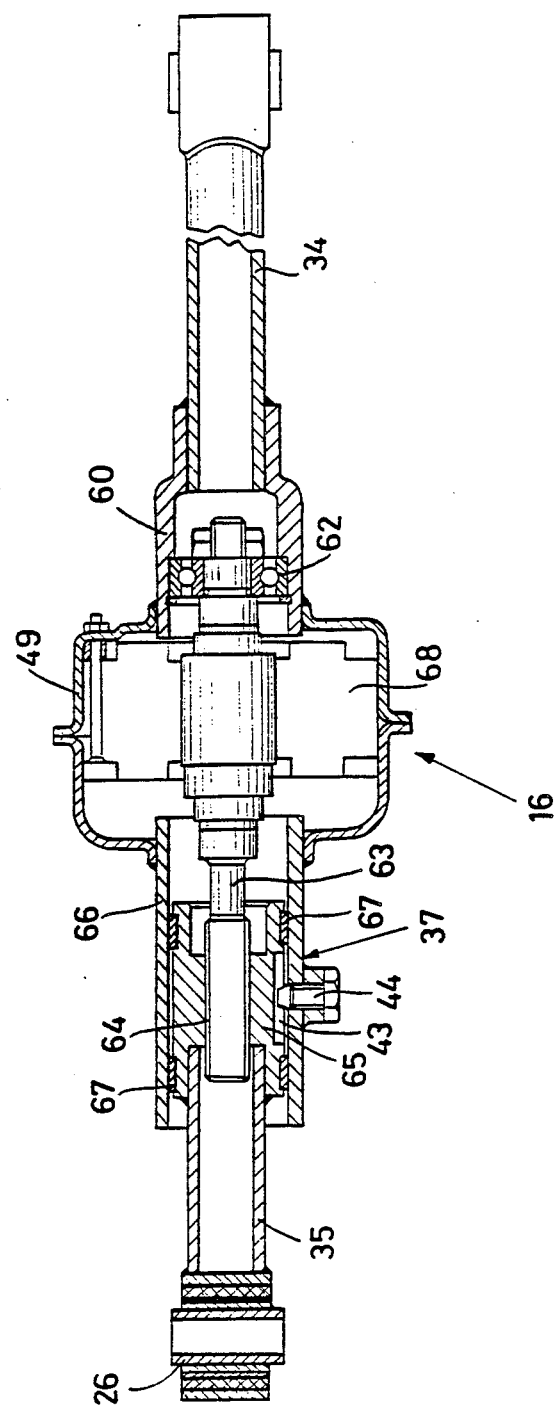
FIGS. 3 and 4 show different forms of embodiment of the same component.

The tie-rods 15 and 16 of FIG. 1 can be also accomplished according to the different form of practical embodiment shown in FIG. 3, wherein same parts are indicated by the same reference numerals as of FIG. 2.

In this case, to the hollow rod 34 a tubular fitting 60 is welded, which in its turn is made integral with the box 49.

Inside the tubular fitting 60, a bearing 62 is housed. Said bearing 62 performs the function of a double thrust bearing, suitable for rotatably supporting the spindle 63 which, by means of the screw-threaded coupling 64, is in engagement with the sleeve 65 welded to the hollow rod 35; the sleeve 65 is supported inside the tubular sheath 66 through the bushes 67 and the mutual coupling of the slot 43 and of the shaped-end screw 44.

By the reference numeral 68 an electrical motor is indicated, which, on command, is capable of driving the spindle 63 to revolve.

The telescopic member 36 of FIG. 3 operates in an analogous way to the telescopic member of FIG. 2, in the meaning that revolutions of the spindle 63 in either directions cause the rods 34 and 35 to approach to, or to move away from, each other, and therefore the tie-rod 16 or the tie-rod 15 to become longer or shorter, as a function of the control signals sent by the central control unit 52.

By means of the above disclosed device, the steering of the wheels 10 and 11, or any changes in their convergence, also cause changes in the track of the rear axle, and changes in camber of the same wheels.

The extent of these changes depends on the position and inclination of the axes around which the wheels 10 and 11 rotate, on the occasion of the steering and of the change in convergence, and hence are influenced by the relative position between each wheel, bush 17, 18 or 22, 23 and articulation of linking of the respective vertical leg with the vehicle body.

Figure 4:
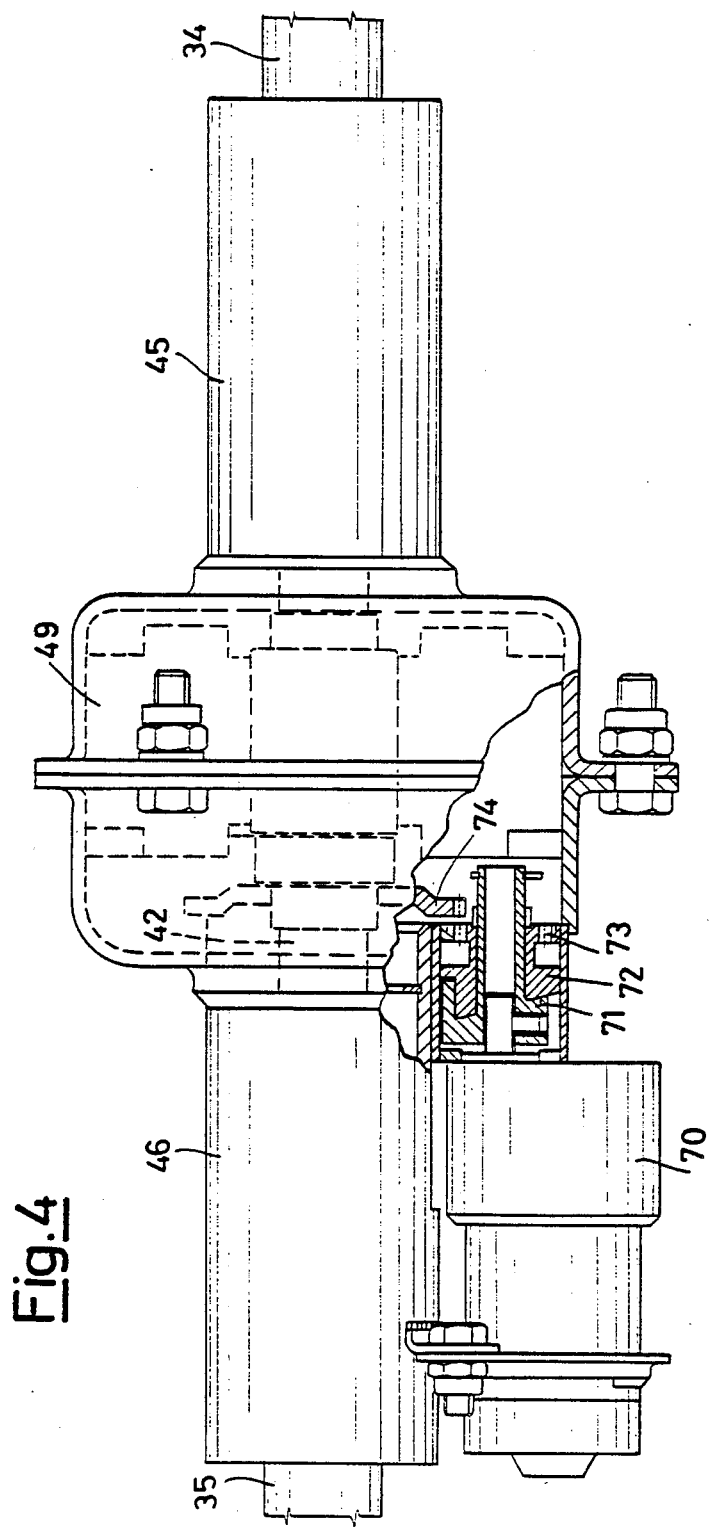

In FIG. 4, a different form of practical embodiment of the device is shown, wherein a reserve actuator is provided, in case the electrical motor 50 undergoes a fault.

The spindle 42 can be driven to revolve by a further electrical motor, indicated by the reference numeral 70, through the coupling wheels 71 and 72 and the gear wheels 73 and 74, when the same wheel 72, owing to the effect of the revolution movement, moves longitudinally, by being pushed by the inclined surface of the wheel 71.

The electrical motor 70 can be controlled by the central unit 52, through the line 75, shown in short-dashed line in FIG. 2, and a similar electrical motor, not shown, provided for the tie-rod 15, can be controlled by the same central control unit 52 through the line 76, also shown in short-dashed line in FIG. 2.

When to the central control unit 52 from the detector units, e.g., like the detector unit 54, feedback signals come, which indicate that the tie-rods 15 and 16 have undergone increases or reductions in length, which do not correspond to the operating conditions of the vehicle, the electrical motors, such as the electrical motor 70, are commanded to actuate the telescopic members 36 and 37 of the same tie-rods, in order to correct the position of the wheels 10 and 11, and to bring said wheels back to their initial position.

The electrical motors 70 can also be operatively connected to push-buttons, not shown in the figures, installed on the dashboard of the vehicle, and the signals coming from the detectors 54 can be displayed on the same dashboard, so that, in case the central control unit 52 undergoes a fault, the same vehicle driver can command the wheels to get back to their straight position.

We claim:

1. Device for independently changing the orientation of the wheels (10, 11) of the same axle of a motor vehicle, provided with a body (12) and with detector means (57, 58) for detecting the values of preselected parameters, indicative of the operating conditions of the motor vehicle, said device comprising at least one arm of suspension (15, 16) for each one of the wheels (10, 11) of the axle, each of said arms being formed by at least two rods (32, 33 or 34, 35) with one of said rods (32 or 34) being constrained to the respective wheel (10 or 11), and the other of said rods (33 or 35) being constrained to the body (12) of the vehicle, the one and the other of said two rods (32, 33 or 34, 35) being interconnected by means of a telescopically coupled member (36, 37), which can be actuated on command in order to increase and to reduce the length of said arm (15, 16) by means of actuator means (50, 68) operatively connected with a central control unit (52), with said central control unit (52) being in its turn operatively connected with said detector means (57, 58), and being capable of generating control signals as a function of the values of the above said parameters, indicative of the operating conditions of the motor vehicle.

2. Device according to claim 1, wherein each of said telescopically coupled members (36, 37) are formed by mutually engaged screw/nut screw elements (38, 40, 42, 41, 39 or 63, 64, 65).

3. Device according to claim 2, wherein said nut screw elements (38, 39 or 65) are integral with said rods (34, 35) and that the screw element (42 or 63) is rotatably supported by said rods (34, 35).

4. Device according to claim 1, wherein said actuator means (50, 68) are constituted by an electrical motor.

5. Device according to claim 3, wherein said electrical motor (50, 68) is supported by said nut screw elements (38, 39 or 65) through sliding couplings (43, 44).

6. Device according to claim 1, wherein said device further comprises safety actuator means (from 70 to 73), operatively connected with said central control unit (52), in order to be commanded to put the wheels (10, 11) straight, and to move them back into their initial position, in case said actuator means (50, 68) incur faults.

7. Device according to claim 4, wherein said electrical motor (50, 68) is supported by said nut screw elements (38, 39 or 65) through sliding couplings (43, 44).

* * * * *